(12) United States Patent
Manges

(10) Patent No.: US 8,924,594 B2
(45) Date of Patent: Dec. 30, 2014

(54) NETWORK ARCHITECTURE FOR SYNCHRONIZED DISPLAY

(76) Inventor: Barbara J. Manges, Cincinnati, OH (US)

(*) Notice: Subject to any disclaimer, the term of this patent is extended or adjusted under 35 U.S.C. 154(b) by 185 days.

(21) Appl. No.: 13/475,146

(22) Filed: May 18, 2012

(65) Prior Publication Data

US 2012/0297090 A1 Nov. 22, 2012

Related U.S. Application Data

(60) Provisional application No. 61/487,380, filed on May 18, 2011.

(51) Int. Cl.
| | |
|---|---|
| *G06F 15/16* | (2006.01) |
| *G06F 15/173* | (2006.01) |
| *H04W 4/02* | (2009.01) |
| *H04L 29/08* | (2006.01) |
| *G06F 3/14* | (2006.01) |
| *H04W 84/18* | (2009.01) |

(52) U.S. Cl.
CPC .............. *H04L 67/18* (2013.01); *H04W 4/028* (2013.01); *H04W 84/18* (2013.01); *G06F 3/1454* (2013.01); *H04W 4/02* (2013.01)

USPC .......................................... 709/248; 709/224

(58) Field of Classification Search
CPC .......... G06F 17/30867; G06F 17/3087; H04L 67/18; H04L 67/306; H04W 4/02; H04W 4/028
USPC ......... 709/203, 217, 219, 223, 224, 226, 248; 715/740; 725/60; 455/456.1; 340/573.4
See application file for complete search history.

(56) References Cited

U.S. PATENT DOCUMENTS

| | | | |
|---|---|---|---|
| 2002/0049975 A1* | 4/2002 | Thomas et al. | 725/60 |
| 2010/0299436 A1* | 11/2010 | Khalid et al. | 709/226 |
| 2011/0246904 A1* | 10/2011 | Pinto et al. | 715/740 |
| 2012/0161971 A1* | 6/2012 | Nasir et al. | 340/573.4 |
| 2013/0040657 A1* | 2/2013 | Jackson | 455/456.1 |

* cited by examiner

*Primary Examiner* — Quang N Nguyen
(74) *Attorney, Agent, or Firm* — Barbara J. Manges; Stephen Jenei; Jenei, LLC

(57) ABSTRACT

Systems and methods are provided that couple one or more devices to one or more presentation screens and to one or more servers via network connections. Various devices can be identified on a network and location data regarding each of the mobile devices can be delivered to the servers. Data can be displayed on a presentation screen based on mobile devices in its proximity, for example.

21 Claims, 5 Drawing Sheets

NETWORK ARCHITECTURE FOR SYNCHRONIZED DISPLAY

CROSS-REFERENCE TO RELATED APPLICATION

This application claims the benefit of U.S. provisional patent application Ser. No. 61/487,380, filed on May 18, 2011, entitled "Network Architecture for Synchronized Display," the disclosure of which is hereby incorporated by reference herein in its entirety.

BACKGROUND

Mobile devices (e.g., handheld computing devices, personal digital assistants, wireless phones, portable game devices, tablets, netbooks, and so on) have become an integral part of everyday life. Accustomed to the instant gratification that mobile devices provide, consumers demand results from service providers substantially in real-time. However, many industries lag behind when it comes to having service providers present results visually in substantially real-time to consumers during in-person meetings, teleconferences and virtual encounters. For example, consumers of financial, healthcare and educational services demand visual results in substantially real-time during in-person meetings. For example, mobile devices may have a relatively limited amount of display area when compared to a conventional desktop computer, such as a PC.

Furthermore, the retail consumer and industry demand for mobile devices is rising, while the demand for traditional desktop computing devices (e.g., PCs) is decreasing. For example, the healthcare industry purchased 8.8 billion mobile devices in 2010, which was a 7% increase over the previous year. Industries have found that using mobile devices in the workplace reduces costs and increases productivity.

SUMMARY

A network architecture is described. In an implementation, a network architecture communicatively couples one or more mobile devices, each mobile device communicatively coupled to one or more presentation screens and one or more servers. A presentation screen includes without limitation a computer monitor, a high-definition television, Internet televisions (such as, ANDROID TV™ television (ANDROID™ is a trademark of Yen International, LLC) and APPLE TV® television (APPLE® is a registered trademark of Apple Inc.) for example), traditional televisions, and a projector and screen unit. In addition, presentation screens can themselves be mobile, and can employ solar technology or radio frequency harvesting to reduce energy costs. The use of a presentation screen employing solar technology, radio frequency harvesting and other alternate energy sources can enable presentations to occur in the absence of an electric outlet, or where available electric outlets are scarce.

Various embodiments include a network architecture configured to identify each of the devices, including presentation screens and mobile devices, communicatively coupled to the network, and to deliver location data regarding each of the mobile devices to the servers.

Also provided is a network architecture configured to enable service providers to deliver presentations to consumers via a presentation screen that mirrors certain displays on the mobile device in substantially real-time. Various embodiments provide a network architecture configured to enable consumers, such as patients, to modify data presented on the presentation screens through a second mobile device. In an implementation, a presentation screen automatically reflects certain displays on the mobile device when the mobile device is within a predetermined proximity of the presentation screen.

In addition, an integrated user interface on a mobile device is described. In an implementation, a mobile device includes a display device and one or more modules. The one or more modules are configured to display data represented in a user interface on the display device and on the presentation screen, automatically and without user interface. The data to be displayed on the presentation screen may be rendered by the mobile device or on one or more data sources communicatively coupled to the mobile device via a network. For example, the integrated user interface is configured to deliver slideshow presentations to consumers via a presentation screen, which mirrors in substantially real-time certain slideshow displays on the display device of the mobile device. In an implementation, an integrated user interface is configured to automatically reflect certain data displayed on a service provider's mobile device onto a presentation screen when the mobile device is communicatively coupled to the network and within a predetermined proximity of the presentation screen.

Various embodiments also include one or more fail-safe detection and prevention processes described herein to prevent sensitive data from reaching unintended recipients. A first fail-safe detection and prevention process of providing networked bracelets to users, such as patients, is provided to track the location of these users to detect their presence in relation to presentation screens before data is sent to the presentation screens. A second fail-safe detection and prevention process is effective to provide wire mesh or other radio frequency-canceling equipment to be installed to prevent the transfer of sensitive data from being distributed to unintended recipients. A third fail-safe detection and prevention process is effective to prevent the delivery of data to presentation screens upon the detection of two or more networked bracelets associated with the same secure wireless personal area network (WPAN) network. Further, certain modules, such as a send certain display module and a stop module, are provided to prevent certain data from being received by unintended recipients. The stop module may have various settings, such as stopping the sending of data to the presentation screen upon manual activation or automatically stopping the sending of data to the presentation screen after a selected period of time has expired.

In one embodiment, a method includes determining, by a computer system, a physical location of a tracking device within an environment. The tracking device is associated with a user and the environment includes one presentation screen. The method further includes determining, by the computer system, data associated with the user. The data is stored in a database in communication with the computer system. The method also includes causing, by the computer system, a display of the data on the presentation screen.

In another embodiment, a method includes Identifying, by a computer system, a plurality of presentation screens in communication with a first wireless network and identifying, by the computer system, a computing device in communication with the first wireless network. The computing device is identified by a unique identification code and the computer device is in communication with one of the plurality of presentation screens through a second wireless network. Upon identifying the computing device, the method includes determining, by the computer system, based on the unique identification code, a data associated with the mobile device and transmitting, by the computer device, via the first wireless the data associated with the mobile device to the presentation device in communication with the computing device.

In yet another embodiment, a system includes a presentation screen in communication with a first network and a second network, a first device in communication with the presentation screen through the first network, and a computer server in communication with the presentation screen through the second network, wherein the first network is different than the second network. The first device is configured to transmit a first data to the presentation screen for display by the presentation screen via the first network. The computer server is configured to transmit a second data to the presentation screen for display by the presentation screen via the second network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Figure 1:
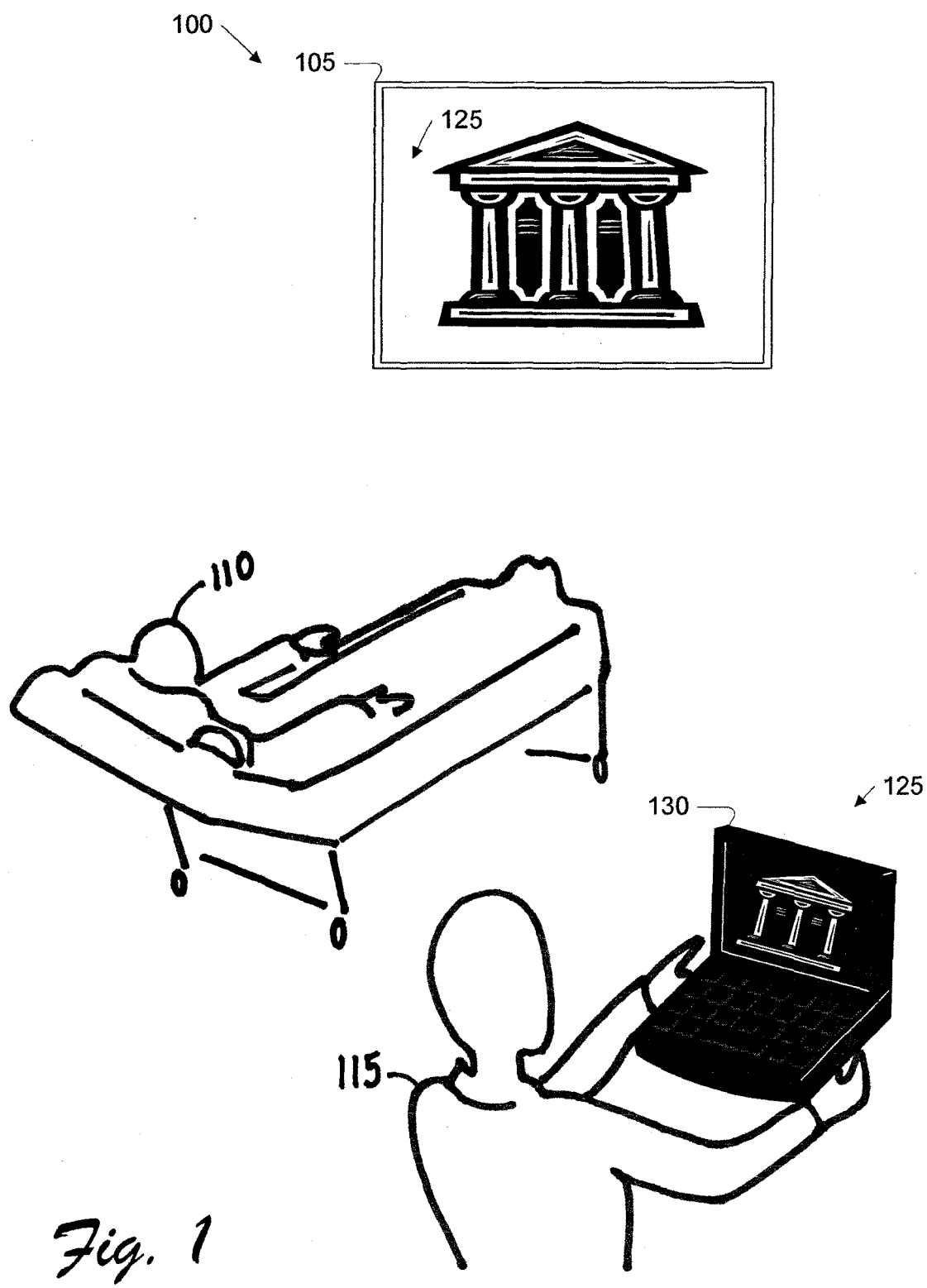
FIG. 1 illustrates an operating environment in which various principles described herein can be employed in accordance with one or more embodiments.

Mobile devices typically have a relatively minimal amount of display to aide mobility of the mobile device. Consequently, mobile devices may be dissatisfying to service provider representatives and consumers when used by the representatives to present data to consumers during in-person meetings. For instance, a doctor working on a wireless phone may find it frustrating when she sees charts, x-rays and other data regarding a patient's prognosis on her wireless phone, but cannot readily share the two inch square display device of the phone with a patient. Likewise, a professor working on a tablet, such as an iPad® (iPad® is a registered trademark of Apple Inc.) may be frustrated when his slideshow is within seconds of reach on the iPad® for his own viewing, but he cannot readily display it to his classroom of students. Moreover, consumers often desire to modify the information presented to them or the service providers desire consumers to provide input on forms, presentations and other media.

A network architecture is described. In an implementation, a network architecture communicatively couples one or more mobile devices, each mobile device communicatively coupled to one or more presentation screens and one or more servers for improved visual communication during in-person meetings, teleconferences and virtual encounters. A presentation screen includes without limitation a television, a computer monitor, a high-definition television, an Internet television, and a projector and screen unit. In an implementation, the network architecture delivers location data regarding each of the mobile devices to the one or more servers. Various embodiments provide a network architecture configured to enable consumers, such as patients, to modify data presented on the presentation screens through a second mobile device.

Also provided are procedures for service providers to deliver presentations to consumers via a presentation screen that displays in substantially real-time certain data displayed on a service provider's mobile device. In an implementation, a presentation screen automatically reflects (or mirrors) certain displays on a service provider's mobile device when the mobile device is within a predetermined proximity of the presentation screen. In an implementation, a first mobile device is configured to project data displayed on the mobile device onto the presentation screen for a second device, such as a second mobile device or a server, configured to collect such data projected by the first mobile device. For example, a patient can fill out an electronic form with input data on the first mobile device (the patient's own mobile device or a mobile device provided to him) and have the data reflected on the presentation screen, which a second mobile device, such as that of a doctor or a nurse, or a hospital server can collect the input data.

Various embodiments include a network architecture including a master server configured to identify each of device, including presentation screens and mobile devices, communicatively coupled to the network, and to deliver location data regarding each of the mobile devices to the servers. Furthermore, the network architecture provides for the master server to be communicatively coupled to a subscriber database of recognized mobile devices. The master server organizes and operates the network, and recognizes devices by unique codes, such as an IP address, stored in the subscriber database.

Various embodiments include one or more fail-safe detection and prevention processes described herein. A first fail-safe detection and prevention process of providing networked bracelets to users, such as patients, is provided to track the location of these users to detect their presence in relation to presentation screens before data is sent to the presentation screens. A second fail-safe detection and prevention process is effective to provide wire mesh or other radio frequency-canceling equipment to be installed to prevent the transfer of sensitive data from being distributed to unintended recipients. A third fail-safe detection and prevention process is effective to prevent the delivery of data to presentation screens upon the detection of two or more networked bracelets associated with the same secure WPAN network. Further, certain modules, such as a send certain display module and a stop module, are provided to prevent certain data from being received by unintended recipients. The stop module may have various settings, such as stopping the sending of data to the presentation screen upon manual activation or automatically stopping the sending of data to the presentation screen after a selected period of time has expired.

In addition, an integrated user interface on a mobile device is described. In an implementation, the mobile device includes a display device and modules. The modules are configured to display data represented in a user interface on the display device and on the presentation screen, automatically and without user interface. The data to be displayed on the presentation screen may be rendered by the mobile device or on one or more computing devices communicatively coupled to the mobile device via a network. The network may be any suitable network, such as wired networks, wireless networks, and hybrid wired-wireless networks. In some embodiments, a Medical Body Area Network (MBAN) or networks related to wireless heath technologies or healthcare communications can be used. The integrated user interface is configured to deliver presentations to consumers via a presentation screen, which mirrors in substantially real-time certain displays on the display device of the mobile device. In an implementation, an integrated user interface is configured to automatically reflect certain data displayed on a service provider's mobile device onto a presentation screen when the mobile device is within a predetermined proximity of the presentation screen.

In the following discussion, a variety of example implementations of a mobile device (such as a mobile device having a touchscreen) are described. Additionally, a variety of different functionality that may be employed by the mobile device is described for each example, which may be implemented in that example as well as in other described examples.

FIG. 1 illustrates an example of an operating environment in which various principles described herein can be employed in accordance with one or more embodiments. A patient's private hospital room 100 is shown. On the wall is mounted a presentation screen 105, specifically a flat screen high-definition television, which a patient 110 watches while recovering from surgery. Other presentation screens can be used, and can be mobile or fixed within the hospital room. Furthermore, in some embodiments, presentation screens can employ solar technology to reduce energy costs. The use of a presentation screen employing solar technology or some other alternate energy source, such as radio frequency harvesting technology, can enable presentations to occur in the absence of an electric outlet, or where available electric outlets are scarce. In various embodiments, certain mobile devices utilize solar technology and/or radio-frequency harvesting technology to maximize battery life.

In the hospital room 100, a doctor 115 visits patient 110 to present post-operation instructions. The doctor creates a slideshow 125 of patient specific post-operation instructions on his mobile device 130 while in the hospital room. The display device of the mobile device 130 syncs with the presentation screen 105 to enable the doctor to present the instructions to the patient. In an example implementation, a portion of the display device of the mobile device 130 is displayed on the presentation screen 105, and in other implementations, the entirety of the display device is displayed on the presentation screen 105.

In an example implementation, the slideshow 125 resides on a database connected to the gateway server operating on a secure hospital network, such as an intranet. In this example, the doctor downloads the slideshow 125 from the database onto his mobile device 130 through the secure network, such as a password protected Wi-Fi® (Wi-Fi® is a registered trademark of the Wi-Fi Alliance) network. The mobile device 130 transmits the slideshow 125 to the presentation screen 105 through a short range wireless network, such as a wireless personal area network (WPAN).

In an example implementation, the presentation screen 105 is a computing device equipped with modules and data of its own. In such implementations, the presentation screen 105 can come preprogrammed with certain standard forms and documents to be shared with individuals, such as patients.

Figure 2:
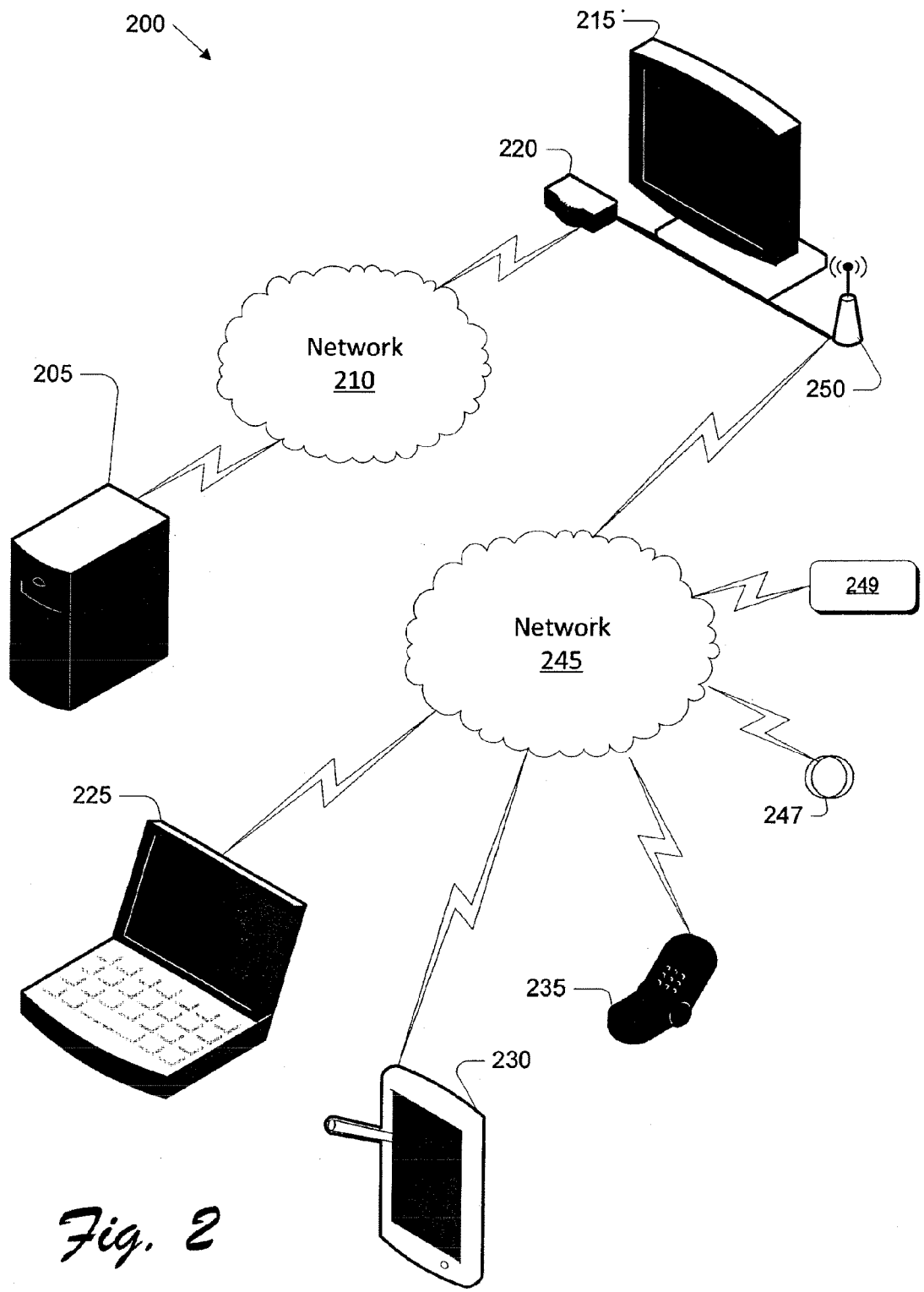
FIG. 2 illustrates an example network architecture in which various principles described herein can be employed in accordance with one or more embodiments.

Network FIG. 2 illustrates an example network architecture 200 in which various principles described herein can be employed in accordance with one or more embodiments.

In the example network architecture 200, server 205 is communicatively coupled through a secure local area network 210 to a presentation screen 215. Server 205 is a server-grade computing device, and can include several computing devices. The secure network 210 may be a local area network (LAN). The secure network may be wired (such as connected via Ethernet cables, for example) or may be a wireless network. In some implementations, a connective device 220 is used to connect the presentation screen 215 through secure network 210 to the server 205.

Mobile devices with display devices, such as a laptop 225, a tablet 230, and a mobile phone 235, communicate through a secure WPAN network 245 with the presentation screen 215. In addition to mobile devices with display devices are tracking devices, such as bracelet 247 and smartcard 249, such as an RFID enabled shopper loyalty card or a RFID enabled credit and/or debit card. Tracking devices do not have display devices. For clarity, mobile devices with display devices can generate location data that can be tracked by server 205. In an example implementation, the network architecture enables the mobile devices to project one or more images on its display device onto the presentation screen 215 through the secure WPAN network 245. In an example implementation in a retail environment, the network architecture enables a server to track the location of a shopper as she enters a display area in a store with a smartcard 249 and enables the server to project marketing content specifically tailored to the shopper onto a presentation screen at a point-of-purchase display in the store.

An example implementation of secure WPAN network 245 is a password protected Wi-Fi® network. An example implementation of WPAN network 245 includes a ZIGBEE® communication network which operates within the Institute of Electrical and Electronics Engineers (IEEE) 802.15.4 communication protocol (ZIGBEE® is a registered trademark of the Zigbee Alliance Corporation). The ZIGBEE® protocol operates in the industrial, scientific and medical (ISM) radio bands; i.e., 868 MHz in Europe, 915 MHz in the USA and 2.4 GHz in most other jurisdictions worldwide. ZIGBEE® technology is intended to be simple, inexpensive and readily maintainable. Likewise, the wireless network connecting the tablet to the television can also be a typical BLUETOOTH® communication network, which was used as the basis for the IEEE 802.11 communication protocol (BLUETOOTH® is a registered trademark of Bluetooth Sig, Inc.). Other wireless networks are also contemplated.

WPAN networks enable WPAN-equipped devices to communicatively couple to each other when they are in close proximity to one another. For example, when the mobile device comes into close proximity (such as within several meters, for example) of the presentation screen 215, the mobile device can communicate with the presentation screen 215 through the WPAN network 245 as if connected by a cable. In an implementation, when the mobile device couples to the WPAN network 245 it locks out other devices selectively, preventing needless interference and unauthorized access to information.

In an implementation, a first mobile device, such as laptop 225, is configured to project data displayed on the first mobile device onto the presentation screen 215 for a second device, such as tablet 230, configured to collect such data projected by the first mobile device. For example, a patient can fill out an electronic form with input data on the first mobile device (the patient's own mobile device or a mobile device provided to him) and have the data reflected on the presentation screen 215, which a second mobile device, such as that of a doctor or a nurse, or a hospital server, such as server 205, can collect the input data from the patient.

In implementations employing presentation screens 215 that are not WPAN enabled off-the-shelf, the presentation screen 215 is physically coupled to a digital media receiver 250 or similar receiver to enable presentation screen communication over secure network 245. The digital media receiver 250 is equipped with one or more radio receivers and one or more transmitters to communicate with other devices, such as the mobile devices, on the WPAN network 245. In selected embodiments, the digital media receiver 250 is housed within the connective device 220. Having described an example network architecture 200, consider now a discussion of another example network architecture.

In an example implementation, server 205 tracks the location of bracelet 247 and smartcard 249 within the operating environment as these tracking devices connect to various WPAN networks, including WPAN network 245. The server can be associated with a subscriber database that provides unique device numbers with the devices' associated users. For example, an account owner named Jane Doe enters a financial institution with a smartcard 249, which in this example is a debit card enabled with an RFID chip. Through the smartcard 249's network association with WPAN network 245 in the financial institution, the server 205 recognizes that Jane Doe has entered the financial institution, recognizes her location, and delivers certain data, such as marketing materials customized to Jane Doe, to a presentation screen 215, which is in close proximity to Jane Doe.

In another example implementation, the bracelet 247 is provided to a patient in a hospital. The presumed location of the bracelet 247 is tracked by server 205 through network 245 and network 230.

Figure 3:
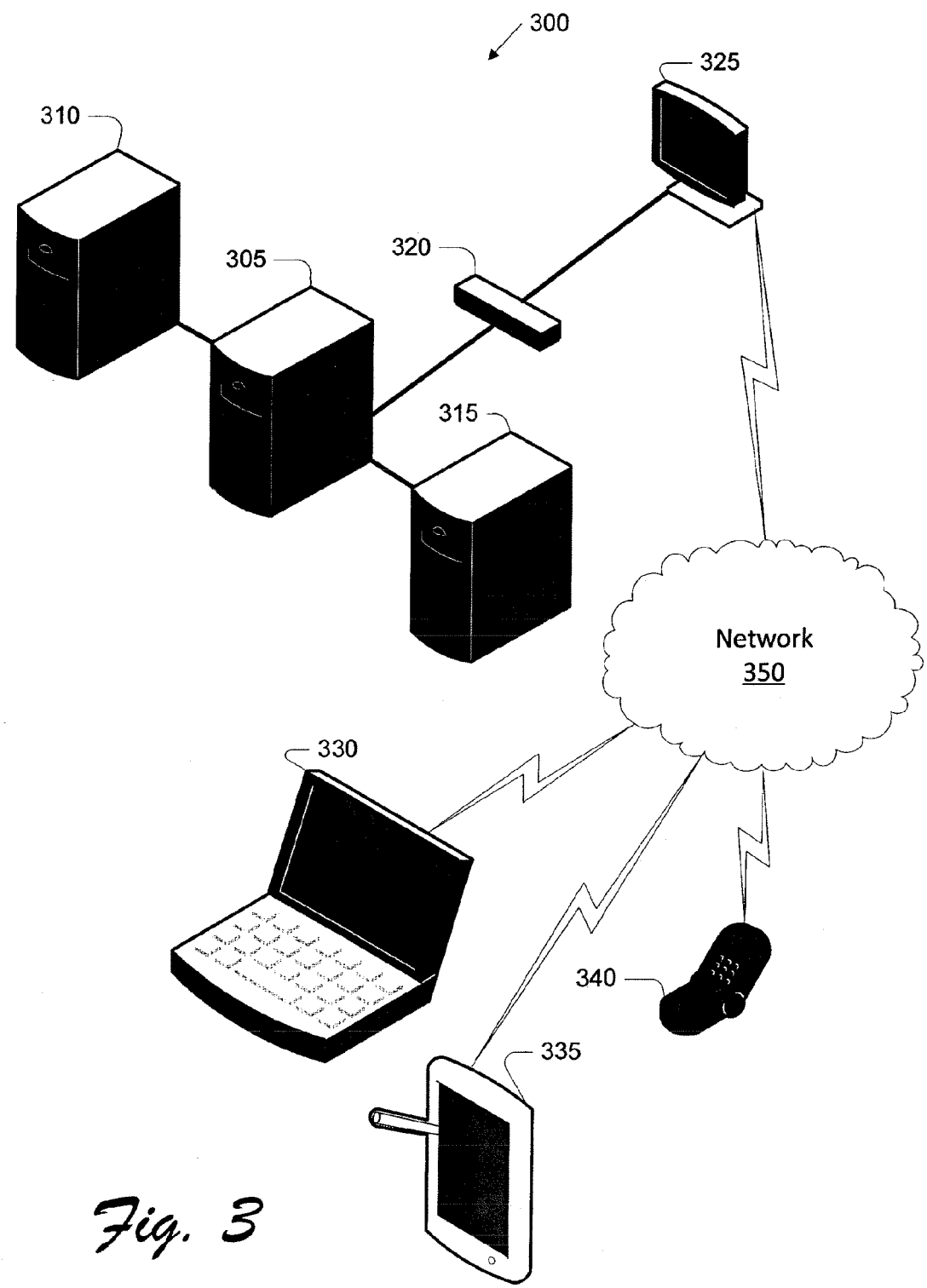
FIG. 3 illustrates an example network architecture in which various principles described herein can be employed in accordance with one or more embodiments.

FIG. 3 illustrates an example network architecture 300 in which various principles described herein can be employed in accordance with one or more embodiments. In the example network architecture 300, a gateway server 305 is coupled to second server 310 and a third server 315. The gateway server is connected to a switch 320 and through cables, such as Ethernet cables, to one or more presentation screens 325.

Mobile devices, such as a laptop 330, a tablet 335, and a mobile phone 340, communicate through a secure WPAN network 350 with the presentation screen 325. In an example implementation, the network architecture is configured to enable a mobile device to display one or more images from its display device onto the presentation screen through the secure WPAN network 350 in substantially real-time.

Figure 4:
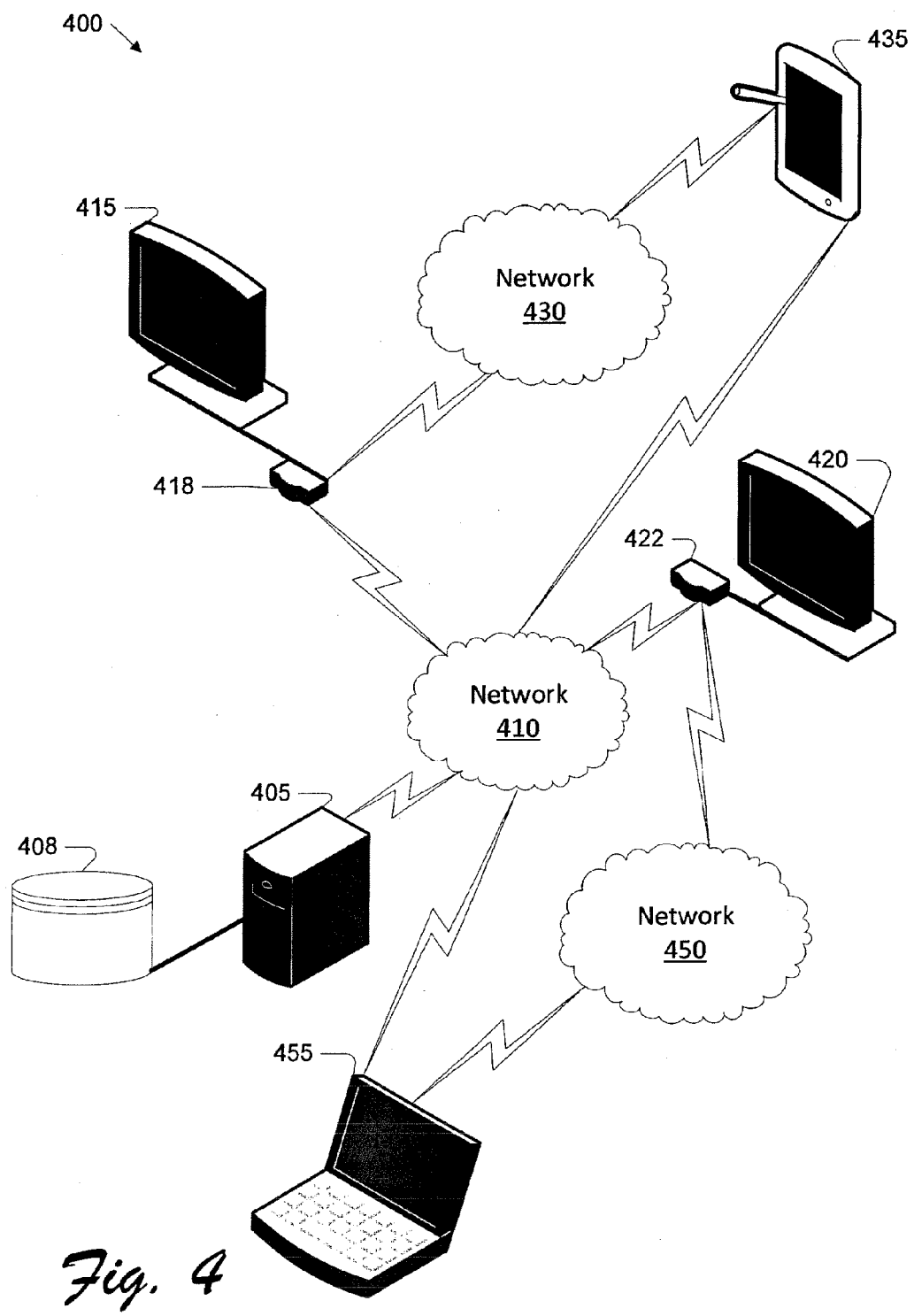
FIG. 4 illustrates an example network architecture illustrating multiple presentation screens, each with its own wireless personal area network (WPAN) network, in which various principles described herein can be employed in accordance with one or more embodiments.

Having described an example network architecture 300, consider now a discussion of an another example network architecture. FIG. 4 illustrates an example network architecture 400. In the example network architecture 400, a server 405 is coupled to a wireless network 410. Server 405 is a master server, which organizes and operates wireless network 410, and recognizes networked devices, including mobile devices and presentation screens, by their unique identification codes, such as IP addresses, stored in a subscriber database 408 associated with the server 405. The subscriber database 408 associates the unique identification codes of each networked devices with users. For example, a presentation screen in a certain hospital room is associated with the patient assigned to that room. The subscriber database 408 can be housed within server 405 or communicatively coupled to server 405 through an Ethernet cord, or through an external network, such as the Internet, on the occasions that the subscriber database 408 is stored with an enterprise server at a remote location, such as an enterprise headquarters. Examples of the subscriber database 408 include without limitation a database of healthcare professionals, a loyalty reward program database, a social network database, and so on. Wireless network 410 may be of any suitable type for data transfer, such as Wi-Fi®.

The server 405 communicates over wireless network 410 with a first presentation screen 415 through a first connective device 418 and a second presentation screen 420 through a second connective device 422. The connective devices 418/422 can be integrated into the internal hardware of the presentation screen 415/420, rendering the presentation screens networked devices, or each of the connective devices 418/422 can be an external hardware component that is physically connected to the presentation screen.

In this example network architecture 400, each presentation screen has its own secure wireless network on its own identifiable radio frequency. Independent secure wireless networks for each presentation screen enables mobile devices to securely push data from the mobile devices or request data from server 405 to be projected onto particular presentation screens while other presentations screens remain available for presentations delivered by other mobile devices on separate secure wireless networks. Connective devices 418/422 are equipped to communicate via a second secure wireless network, such as Bluetooth, for proximity based communication and location detection of the mobile devices. As discussed above, connective devices 418/422 are housed within the presentation screens 415/420, for example, when the presentation screens 415/420 are networked televisions. Thus, a first mobile device 435 communicates through the first connective device 418 and through a first secure WPAN network 430 with first presentation screen 415.

In an example implementation of the example network architecture 400, the first mobile device 435 is configured to activate a display of data stored in connection with the server 405 on the first presentation screen 415 through wireless network 410. In an example implementation of the example network architecture 400, the first mobile device 435 is configured to deliver in substantially real-time data generated on the first mobile device 435 through wireless network 410 to the first presentation screen 415. In an example implementation of the example network architecture 400, the first mobile device 435 is configured to deliver in substantially real-time data generated on the first mobile device 435 through the first secure WPAN network 430 to the first presentation screen 415.

Because the server 405 recognizes the IP address of the first mobile device 435 and recognizes that it is communicatively coupled to a first presentation screen 415 through secure WPAN network 430, responsive to the first mobile device 435 data request, the server 405 delivers data to the first presentation screen 415 securely over wireless network 410 to the first presentation screen 415 and not to other presentation screens connected to the wireless network 410.

In an example implementation, the data presented on the first presentation screen 415 is associated with a user identified as assigned to the room in which the first presentation screen 415 is located. The server 405 identifies users associated with each device through the subscriber database 408. For example, as a doctor with the first mobile device 435, which previously associated with wireless network 410 upon the doctor's arrival to a hospital with the first mobile device 435 in operation mode, enters a first patient's room in which the first presentation screen 415 is located, the first mobile device 435 associates with the first secure WPAN network 430, and data associated with first patient is displayed upon the first presentation screen 415. Such data can be stored on a database associated with server 405 and is triggered to be sent to the first presentation screen 415 by a request sent to the server 405 from the first mobile device 435. According to settings on the first mobile device 435, the data request can be automatically sent as the first mobile device associates with the secure WPAN networks 430/450.

In an example implementation, as a data request is received by server 405, a response is prepared and delivered to the requested destination in substantially real-time. Hence, as the first mobile device 435 is in close proximity to the first secure WPAN network 430 in the first hospital room with the first presentation screen 415 and a first patient is assigned to the first hospital room equipped, the server 405 delivers certain electronic medical records associated with the first patient automatically to the presentation screen according to a module on the first mobile device. According to settings on the first mobile device 435, data requests to be presented on the presentation screen can be sent manually, and a subset of user data can be delivered automatically or manually. Various fail-safe detection and prevention processes are described herein and will be described in turn.

Continuing with the example implementation described above in connection with FIG. 4, according to a first fail-safe detection and prevention process, the data associated with the first patient is sent to the first presentation screen 415 upon the server 405 discovering that a networked bracelet (such as bracelet 247 in FIG. 2) assigned to the first patient is associated with the first secure WPAN network 430. In this example implementation, if the first patient is associated with the first secure WPAN network 430, then the first patient is in the first hospital room, since the first secure WPAN network 430 has a small range.

In selected embodiments, according to a second fail-safe detection and prevention process, wire mesh or other radio frequency-cancelling equipment can be installed to prevent sensitive data from being distributed to unintended recipients. In selected embodiments, a third fail-safe detection and prevention process can be implemented.

The third fail-safe detection and prevention process includes sending a delivery failure message to the first mobile device 435 upon receiving a data request at the server 405 on the event that the server 405 detects two or more networked bracelets associated with the first secure WPAN network 430. This third fail-safe detection process is useful when two or more patients are placed in a single hospital room with a single presentation screen that is viewable by all patients in the hospital room.

Various embodiments provide for any combination of the above described fail-safe detection and prevention processes to be employed in a network architecture. Further still, no fail-safe detection and prevention process may be employed in a network architecture.

In addition, a second connective device 422 communicatively couples the presentation screen 420 with a second secure WPAN network 450. A second mobile device 455 is connected to second secure WPAN network 450. In an example implementation, as the second mobile device 455 is placed within range of the second secure WPAN network 450, certain data displayed on the second mobile device 455 is automatically forwarded through wireless network 410 to the second presentation screen 420. In an example implementation, according to settings on the second mobile device 455, as the second mobile device 455 is placed within range of the second secure WPAN network 450, certain data displayed on the second mobile device 455 is automatically forwarded through the second WPAN network 450 to the second presentation screen 420.

The second mobile device 435 will not present materials onto the second presentation screen 420 without activation of certain modules and settings on the second mobile device 435 to recognize the second secure WPAN network 450. Thus, each mobile device in the example network architecture 400 securely sends data to its respective presentation screen. Such an implementation is useful where privacy is of concern, such as in the sharing of (1) medical records to patients in hospital rooms, (2) financial records in conference rooms in financial institutions, and (3) medical and educational records by counselors and advisors in educational institutions.

Figure 5:
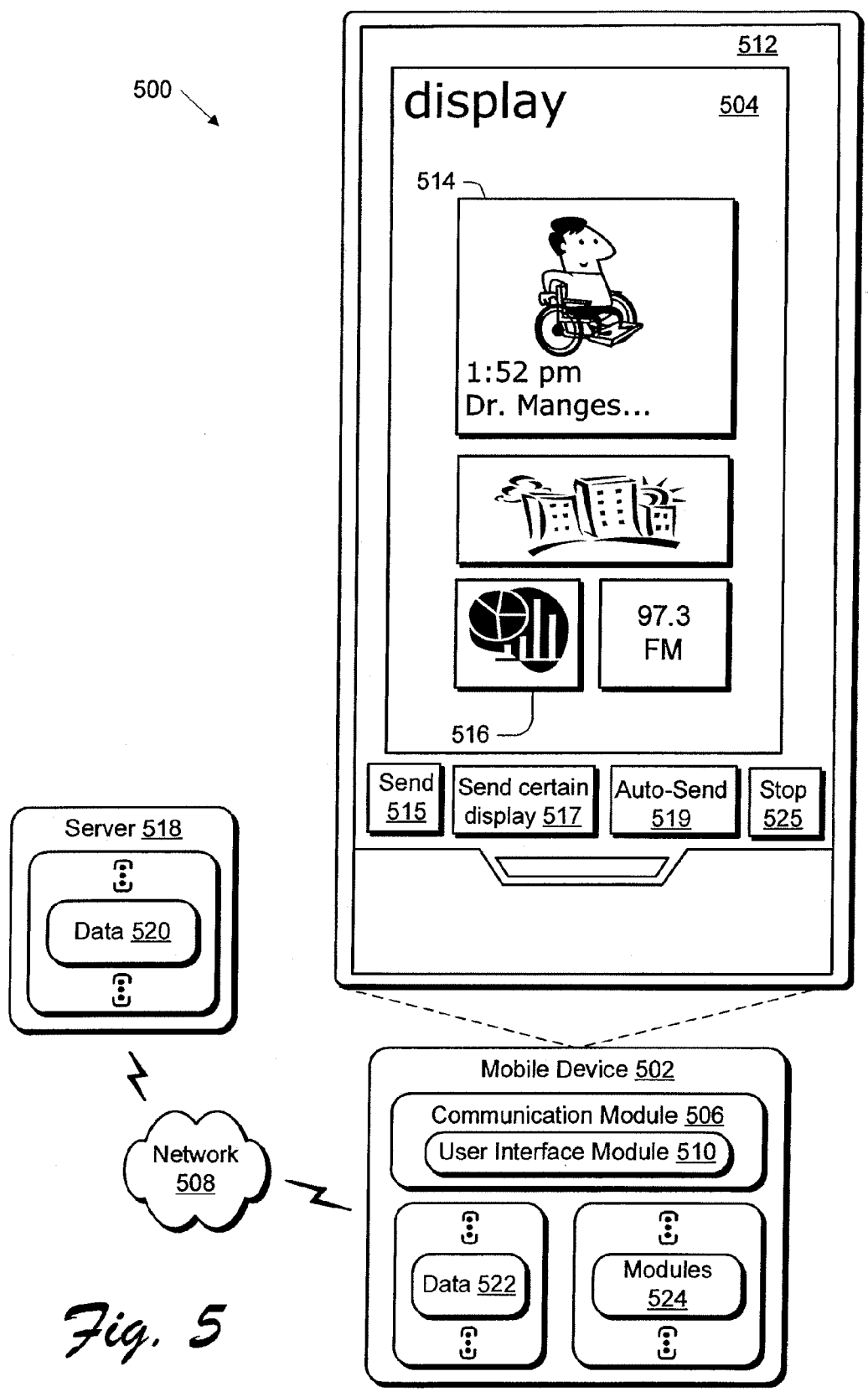
FIG. 5 is an illustration of an example implementation of a mobile device in accordance with one or more embodiments of devices, features, and systems for rendering media.

FIG. 5 is an illustration of an example implementation 500 of a mobile device 502 in accordance with one or more embodiments of devices, features, and systems for selecting data. The mobile device 502 includes a display device 504 that may be used to output a variety of content, such as a caller identification (ID), electronic medical records, contacts, images (such as photos, x-rays, graphs, charts, slideshows, for example) as illustrated, email, multimedia messages, Internet browsing, game play, music, video and so on. In an implementation, the display device 504 is configured to function as an input device by incorporating touchscreen functionality, e.g., through capacitive, surface acoustic wave, resistive, optical, strain gauge, dispersive signals, acoustic pulse, and other touchscreen functionality. For example, mobile device 502 includes laptops, mobile phones, tablets and personal digital assistants.

The mobile device 502 is also illustrated as including a communication module 506. The communication module 506 is representative of functionality of the mobile device 502 to communicate via a network 508, e.g., via browser functionality. In another example, the communication module 506 may include telephone functionality to make and receive telephone calls. The communication module 506 may also include a variety of other functionality, such as to capture content, form short message service (SMS) text messages, multimedia messaging service (MMS) messages, emails, status updates to be communicated to a social network service, conduct telephone calls, and so on. A variety of other examples are also contemplated, such as producing financial records, financial plans, educational records, educational presentations, demonstratives, medical records.

The mobile device 502 is also illustrated as including a user interface module 510. The user interface module 510 is representative of functionality of the mobile device 502 to generate, manage, and/or output a user interface 512 for display on the display device 504. A variety of different techniques may be employed to generate the user interface 512 such that the user interface 512 may provide a variety of functionality.

For example, the user interface module 510 may configure the user interface 512 to act as an integrated data hub for the display device 504 and a presentation screen (such as presentation screen 215 of FIG. 2). For instance, the user interface 512 includes a first window 514 that includes representations of data, in this event an image of a man in a wheelchair, produced by the mobile device 502.

As an integrated data hub, the user interface 512 may represent data from a variety of different sources. For example, a second window 516 in the user interface may represent data that is accessible by the mobile device 504 via the network 508, such as from a server 518 having one or more items of data 520. The data 520 may take a variety of forms, such as electronic medical records, which include photographs of x-rays, charts, graphs, forms and documents.

For example, the data 520 from the server 518 reflected in a second window 516 includes charts and graphs. The data 520 may also be representative of data that is available for download over the network 508 for local storage on the mobile device 502, which may be represented as data 522. In another example, other portions may be provided such as financial records, educational slideshows, articles, and so on that are not specific to the mobile device 502 but instead are provided by a service provider, e.g., the server 518. Thus, a wide variety of different data may be represented in the user interface 512 by the user interface module 510.

The mobile device 504 is configured to display its data on a presentation screen (see FIGS. 1-4). The mobile device 504 is configured to display the data of the entire display device 504 to the presentation screen when the "send" module 515 is selected. The mobile device 504 is also configured to send a smaller portion of the display device 504, such as just the data displayed in window 514 or the data shown in window 516 to the presentation screen. The "send certain display" module 517 is configured to send less than the entire display device 504 to the presentation screen upon activation. In addition, all or a portion of the display device 504 may be presented on the presentation screen upon activation of the "auto-send" module 519. Also, a "stop" module 525 is provided which is configured to stop the sending of data to the presentation screen for display thereon upon activation of the stop module 525.

Further in the description of FIG. 5, to provide a wide variety of different data in a variety of media ultimately to the presentation screen, the user interface module 510 may leverage one or more modules 524, which may be configured to render particular types of data. For example, one of the modules 524 may be configured to render charts and graphs, another one of the modules 524 may be configured to fetch and render streaming data 520 over the network 508, and so on. Thus, the user interface module 510 may configure the user interface to include representations of data from a variety of different sources and provide access to the data through a variety of different modules 524. Further, through the send module 515, send certain display 517 and auto-send module 519, the user has options for delivering data to the presentation screen. In this way, the user interface 512 integrates this data to be selectable for rendering in a single view on the presentation screen.

The examples presented herein are intended to illustrate potential and specific implementations of the present disclosure. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless email device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

What is claimed is:

1. A method of determining a physical location of a tracking device within an environment, comprising:
    providing at least one tracking device configured to transmit location data signals corresponding to the location of the at least one tracking device wherein the at least one tracking device is associated with a user;
    configuring a network architecture with a computer system to identify each of the tracking devices and receive location data signals regarding each of the tracking devices within a defined operating environment when they are in close proximity to one another, wherein the computer system is communicatively coupled to a database;
    receiving the location data signals from the at least one tracking device wherein the network architecture delivers location data regarding the at least one tracking device to one or more servers;
    determining, by the computer system, the location of the at least one tracking device and identifying the data associated with the user; and
    configuring the network architecture to enable the one or more servers to project content specifically tailored to the user onto at least one presentation screen,
    wherein the content is rendered by the one or more tracking device, a user's mobile device or on one or more computing devices communicatively coupled to the mobile device or the at least one tracking device via one or more networks;
    wherein an integrated user interface is configured to reflect certain content onto the at least one presentation screen when the mobile device is within a predetermined proximity of the operating environment.

2. The method of claim 1, wherein the method comprises the further step of delivering location data to one or more presentation screen.

3. The method of claim 2, wherein the at least one tracking device is the user's mobile device or one or more computing devices communicatively coupled to the user's mobile device.

4. The method of claim 3, wherein the at least one tracking device is a mobile device.

5. The method of claim 4, wherein the mobile device is a device selected from the group consisting of a laptop computer, a tablet computer, a mobile telephone, a personal digital assistant, a bracelet, and a smartcard.

6. The method of claim 1, wherein the network architecture is configured to include one or more fail-safe detection and prevention processes.

7. The method of claim 1, wherein the operating environment is a retail environment.

8. The method of claim 1, wherein the at least one tracking device comprises a first device that wirelessly connects to a second device selected from the group consisting of a laptop computer, a tablet computer, a mobile telephone, a personal digital assistant, a bracelet, and a smartcard.

9. The method of claim 8, wherein the first device is an RFID enabled device and the second device is a mobile device.

10. The method of claim 1, wherein the at least one tracking device comprises a mobile device that wirelessly connects to a second device, wherein the second device is a connective device configured to communicate with the network.

11. The method of claim 10, wherein the connective device is equipped to communicate with a wireless network for proximity based communication and location detection of the mobile devices.

12. The method of claim 11, wherein the mobile device is selected from the group consisting of a laptop computer, a tablet computer, a mobile telephone, a personal digital assistant, a bracelet, and a smartcard.

13. The method of claim 12, wherein the network architecture is configured to enable a server to track the location of the user in an operating environment.

14. The method of claim 12, wherein the network architecture is configured to enable a server to recognize the user has entered an operating environment.

15. The method of claim 11, wherein the connective device comprises a digital media receiver equipped with one or more receivers and one or more transmitters to communicate with other devices.

16. The method of claim 10, wherein the network architecture is configured to enable a server to track the location of the user within a predetermined proximity of the operating environment.

17. The method of claim 10, wherein the presentation screen is coupled to a digital media receiver.

18. The method of claim 10, wherein the network architecture is configured with a stop module.

19. The method of claim 1, wherein the network architecture is configured with a server associated with a subscriber database that provides unique identification codes associated with the devices' associated users.

20. The method of claim 1, wherein the at least one tracking device connects through a secure WPAN network.

21. The method of claim 1, wherein the network architecture is configured to enable a user to modify data presented on a presentation screen through a second mobile device.

* * * * *